United States Patent [19]

Takao et al.

[11] Patent Number: 5,037,891
[45] Date of Patent: Aug. 6, 1991

[54] MODIFIED ETHYLENE-α-OLEFIN COPOLYMER RUBBER AND A PROCESS FOR PRODUCING THE SAME

[75] Inventors: Hiroyoshi Takao, Chiba; Akio Imai; Mitsuji Tsuji, both of Ichihara, all of Japan

[73] Assignee: Sumitomo Chemical Company, Limited, Osaka, Japan

[21] Appl. No.: 353,756

[22] Filed: May 18, 1989

Related U.S. Application Data

[63] Continuation-in-part of Ser. No. 122,859, Nov. 17, 1987, abandoned.

[30] Foreign Application Priority Data

Nov. 21, 1986 [JP] Japan ............................... 61-279422

[51] Int. Cl.$^5$ .................... C08F 255/04; C08F 255/06
[52] U.S. Cl. ..................................... 525/263; 525/285
[58] Field of Search ................................ 525/263, 285

[56] References Cited

U.S. PATENT DOCUMENTS

| | | | |
|---|---|---|---|
| 3,177,270 | 4/1965 | Jones | 525/285 |
| 3,639,511 | 2/1972 | Kreibich | 525/263 |
| 3,708,555 | 1/1973 | Gaylord | 525/285 |
| 3,883,458 | 5/1975 | Mueller | 252/285 |
| 4,127,617 | 11/1978 | Arrighetti | 525/285 |
| 4,134,927 | 1/1979 | Tomoshige | 525/285 |
| 4,161,452 | 7/1979 | Stambaugh | 525/285 |
| 4,661,549 | 4/1987 | Walker | 525/285 |
| 4,929,682 | 5/1990 | Banzi | 525/285 |

FOREIGN PATENT DOCUMENTS

| | | |
|---|---|---|
| 0011474 | 5/1980 | European Pat. Off. |
| 2023154 | 11/1970 | Fed. Rep. of Germany |
| 104808 | 5/1987 | Japan ................................. 525/285 |

OTHER PUBLICATIONS

Chemical Abstracts description of registry #106642-9-6-0.
Chemical Abstracts, vol. 97, No. 2, Jul. 1982, p. 35, abstract No. 7238v.

*Primary Examiner*—John C. Bleutge
*Assistant Examiner*—David Buttner
*Attorney, Agent, or Firm*—Stevens, Davis, Miller & Mosher

[57] ABSTRACT

A modified copolymer rubber obtained by kneading at 200°–280° C.

(A) at least one copolymer rubber material selected from the group consisting of an ethylene-α-olefin copolymer rubber having a number-average molecular weight of 10,000–100,000 and an ethylene content of 15–85% by weight and an ethylene-α-olefin-nonconjugated diene copolymer rubber having a number-average molecular weight of 10,000–100,000, an ethylene content of 15–85% by weight and a nonconjugated diene content of 3.0% by weight or less,
(B) a free-radical initiator,
(C) at least one vinyl aromatic monomer and
(D) an unsaturated dicarboxylic anhydride, wherein the weight ratios of (B):(A), (C):(A), (D):(A) and (C):(D) are 0.005–1.0:100, 0.2–20:100, 0.5–15:100 and 0.1–3:1, respectively.

The process is suited for industrially producing a modified copolymer rubber having a high bound unsaturated dicarboxylic anhydride content, a low tendency of increase of the Mooney viscosity [$ML_{1+4}$ (121° C.)], and an excellent moldability and storage stability without being obstructed by gel formation during the kneading. The modified copolymer rubber thus obtained can be advantageously used for thermoplastic elastomer, blending polymer adhesive etc.

16 Claims, No Drawings

MODIFIED ETHYLENE-α-OLEFIN COPOLYMER RUBBER AND A PROCESS FOR PRODUCING THE SAME

CROSS-REFERENCE TO RELATED APPLICATIONS

This is a continuation-in-part of application Ser. No. 122,859, filed on Nov. 17, 1987 now abandoned.

The present invention relates to an improved unsaturated dicarboxylic anhydride-modified ethylene-α-olefin copolymer rubber and a process for producing the same. Particularly, it relates to an unsaturated dicarboxylic anhydride-modified copolymer rubber having a high bound unsaturated dicarboxylic anhydride content, an excellent molding property, a low gel formation property and an excellent storage stability and an improved process for producing the same.

Ethylene-α-olefin copolymer rubber or ethylene-α-olefin-nonconjugated diene copolymer rubber, typical examples of which are ethylene-propylene copolymer rubber (hereinafter referred to as EPM) and ethylene-propylene-nonconjugated diene copolymer rubber (hereinafter referred to as EPDM), having an excellent resistance to weather, heat, ozone etc. are widely used for industrial materials for automotive parts and the like.

However, it has been said that they are inferior in oil resistance, adhesiveness and co-vulcanizability with highly unsaturated diene rubbers, so a development in these properties is desired.

In recognition of this situation, there has been proposed a process that a polar monomer (maleic anhydride or the like) is grafted on EPM or EPDM in order to improve adhesiveness and mechanical properties thereof.

For example, a process comprising grafting unsaturated dicarboxylic acid or anhydride thereof on EPM in an alkyl aromatic hydrocarbon media in the presence of a free-radical initiator is disclosed in Japanese Patent Publication Kokoku (Post-Exam) No. 53,005/83.

However, this process is not desirable in view of the economical efficiency or payability in industry. Because, for this process, a recovering stage (precipitation by introducing a crude reaction product into a large volume of acetone or steam stripping etc.) is necessary, accordingly, a recovering facilities has to be constructed and a large amount of an expensive solvent has to be consumed.

U.S. Pat. No. 4,661,549 discloses a process for producing a graft polymer comprising reacting an ethylenically unsaturated polymerizable monomer with a polymer of an olefin of 2 to about 8 carbon atoms. It contains exemplary disclosure about a process for grafting styrene and maleic anhydride onto a blend of an EPDM and a high-density polyethylene.

However, the process of U.S. Pat. No. 4,661,549 is unsatisfactory for modifying an EPDM elastomer as the authors themselves mention at Column 7, lines 20–23. Additionally, the process is carried out at a lower temperature for a longer period of time than the process of the present invention. Accordingly the process is quite disadvantageous when applied to the continuous process.

On the other hand, in order to remove the disadvantage, there have been disclosed various processes comprising grafting an unsaturated dicarboxylic anhydride on EPM or EPDM by means of a kneader, such as an extruder.

For example, in Japanese Patent Publication Kokoku (Post-Exam) No. 11,679/60, there is disclosed a process comprising a simultaneous grafting and crosslinking of maleic anhydride followed by an ionic crosslinking through zinc oxide or the like.

And, in Japanese Patent Publication Kokoku (Post-Exam) No. 19,351/78, Japanese Patent Application Kokai (Laid-Open) Nos. 104,992/74 and 67,348/75, there are disclosed processes comprising a thermal addition of maleic anhydride in an extruder followed by a crosslinking through a metal salt or the like.

However, these ionic crosslinked maleic anhydride-modified rubbers are disadvantageous in that they have no fluidity even at an elevated temperature so that it is very difficult to mold them under a normal molding conditions.

U.S. Pat. No. 3,708,555 discloses a process for preparing carboxyl-containing polymer products which comprises reacting at 120° C. or more polymers having active or labile hydrogen atoms such as ethylenepropylene rubber with a mixture of styrene and maleic anhydride kept at 50°–70° C. and the carboxyl-containing polymer products prepared thereby. However, the process is disadvantageous because no free-radical initiator is employed therein so that the products sufficiently grafted with maleic anhydride cannot be obtained.

In Japanese Patent Publication Kokoku (Post-Exam) No. 445/83, there is disclosed a process for producing a thermoplastic elastomer comprising a grafting of maleic anhydride etc. in an extruder in the presence of a peroxide.

However, by this process, no great improvement is expected. Because when a large amount of maleic anhydride, for example, is intended to be grafted on EPM or EPDM, the Mooney viscosity $[ML_{1+4}(121° C.)]$ thereof becomes very high, a gel formation takes place depending on the kneading conditions and a rubber having excellent properties and processability cannot be obtained. Accordingly, this process is substantially usable only for producing a modified rubber having a low bound unsaturated dicarboxylic anhydride content.

Moreover, it is found that the unsaturated dicarboxylic anhydride-bound thermoplastic elastomers prepared by the above-mentioned process has disadvantages that a gel formation occurs and the Mooney viscosity thereof becomes high when it encounters the conditions requiring a good roll processability. This is because the bound unsaturated dicarboxylic anhydride easily changes to dicarboxylic acid form by water in the air during the storage.

Thus, an object of the present invention is to provide an unsaturated dicarboxylic anhydride-modified copolymer rubber having a high bound unsaturated dicarboxylic anhydride content, excellent processability and storage stability, a low gel formation property and a low tendency of increase of the Mooney viscosity as well as high economical efficiency and payability and a process for producing the same.

The present inventors have made extensive research to obtain such a modified copolymer rubber to surprisingly find that a modified copolymer rubber obtained by kneading ethylene-α-olefin copolymer rubber, a free-radical initiator, vinyl aromatic monomers and unsaturated dicarboxylic anhydride has a high bound unsaturated dicarboxylic anhydride content, a low gel formation property, a low tendency of increase of the Mooney viscosity, a low conversion of the bound unsaturated dicarboxylic anhydride to dicarboxylic acid form by water, an excellent processability and storage stability compared with conventional modified copolymer rubbers prepared without a vinyl aromatic monomer.

According to the present invention, there are provided a modified copolymer rubber obtained by kneading at 200°–280° C.

(A) at least one copolymer rubber material selected from the group consisting of an ethylene-$\alpha$-olefin copolymer rubber having a number-average molecular weight of 10,000–100,000 and an ethylene content of 15–85% by weight and an ethylene-$\alpha$-olefin-nonconjugated diene copolymer rubber having a number-average molecular weight of 10,000–100,000, an ethylene content of 15–85% by weight and a nonconjugated diene content of 3.0% by weight or less, (B) a free-radical initiator, (C) at least one vinyl aromatic monomer and (D) an unsaturated dicarboxylic anhydride, the bound vinyl aromatic monomer content and the bound unsaturated dicarboxylic anhydride content in the modified copolymer rubber being 0.1–5% by weight and 0.1–5% by weight, respectively, based on the weight of the copolymer rubber material and a process for producing the same.

As the ethylene-$\alpha$-olefin copolymer rubber used in the present invention, any ethylene-$\alpha$-olefin copolymer rubber usually used in rubber industry can be used. Preferably, copolymers or terpolymers of ethylene with one or two $\alpha$-olefins having three to eight carbon atoms are used. Specific examples of such copolymer rubbers are copolymers of ethylene with propylene, 1-butene, 1-pentene, 1-hexene, 4-methyl-1-pentene, 1-octene or the like, terpolymers such as ethylene-propylene-1-butene copolymer rubber and the like. More preferably, ethylene propylene copolymer rubber and ethylene-1-butene copolymer rubber are used.

Ethylene-$\alpha$-olefin-nonconjugated diene copolymer rubbers usually used in the rubber industry can be also used in the present invention. Specific examples of the nonconjugated dienes are ethylidene norbornene and the like. The nonconjugated diene content in the copolymer rubber is preferably 3% by weight or less. When the nonconjugated diene is over said content, gel formation tends to take place.

The ethylene content in the ethylene-$\alpha$-olefin copolymer rubber or the ethylene-$\alpha$-olefin-nonconjugated diene copolymer rubber of the copolymer rubber material used in the present invention is preferably 15–85% by weight, more preferably 30–80% by weight. When the ethylene content is over 85% by weight, a high crystaline copolymer rubber is obtained, the processability of which tends to be deteriorated under a normal molding conditions of the rubber. On the other hand, when the content is less than 15% by weight, the copolymer rubber obtained loses rubbery property thereof by the increase of the glass-transition temperature.

The number-average molecular weight of the ethylene-$\alpha$-olefin copolymer rubber or the ethylene-$\alpha$-olefin-nonconjugated diene copolymer rubber of the copolymer rubber material used in the present invention falls in the range where an ordinary extruder can knead the copolymer, which is usually 10,000–100,000. When the molecular weight is too small, supplying the copolymer rubber material into the extruder becomes difficult. On the other hand, when the molecular weight is too large, the fluidity thereof becomes too poor to be processed.

The number-average molecular weight of the ethylene-$\alpha$-olefin copolymer rubber and the ethylene-$\alpha$-olefin-nonconjugated diene copolymer rubber can be determined by gel permeation chromatography (GPC). The conditions are as follows:

GPC: Type 150C mfd. by Waters Associates, Inc.
Column: Shodex 80MA mfd. by Showa Denko K. K.
Amount of Sample: 300 $\mu$l (polymer concentration: 0.2% by weight)
Flow rate: 1 ml/min
Temperature: 135° C.
Solvent: trichlorobenzene The calibration curve to calculate the number-average molecular weight is drawn by a conventional method using standard polystyrene mfd. by Toyo Soda Manufacturing Co., Ltd. The data handling is carried out by using Data Processor CP-8 Model III mfd. by Toyo Soda Manufacturing Co., Ltd.

The molecular-weight distribution of the ethylene-$\alpha$-olefin copolymer rubber and ethylene-$\alpha$-olefin-nonconjugated diene copolymer rubber of the copolymer rubber material used in the present invention are not critical, and any of commercially available copolymer rubbers having various molecular-weight distributions such as monomodal type, bimodal type or the like can be used in the present invention.

The copolymer rubber material can be obtained, for example, by the polymerization in the presence of the so-called Ziegler-Natta catalyst, which is usually used for manufacturing copolymer rubbers. As a catalyst, for example, there can be used a combination of an organic aluminum compound and a hydrocarbon-soluble tri-, tetra- or pentavalent vanadium compound or the like. Specific examples of the above-mentioned aluminum compounds are alkylaluminum sesquichloride, trialkylaluminum, dialkylaluminum monochloride and mixtures thereof. Specific examples of the vanadium compounds are oxyvanadium trichloride, vanadium tetrachloride, vanadate compounds indicated by the general formula VO(OR)$_n$X$_{3-n}$ (wherein $0 < n \leq 3$, R represents a straight-chain, branched-chain or cyclic hydrocarbon group having 1–10 carbon atoms) and the like.

The so-called Q value of the molecular-weight distribution (weight-average molecular weight/number-average molecular weight) is preferably 1–30, more preferably 2–20.

It is preferable for the free-radical initiator used in the present invention to effectively generate a free radical at the reaction temperature, and organic peroxides are preferably used. Specific examples of the organic peroxides used are dicumyl peroxide, 1,1-bis(t-butylperoxy)-cyclohexane, 1,1-bis(t-butylperoxy)-3,3,5-trimethylcyclohexane, 2,5-dimethyl-2,5-di(t-butylperoxy)-hexane, $\alpha,\alpha'$-bis(t-butylperoxy-m-isopropyl)benzene, di-t-butylperoxide, t-butyl cumylperoxide and the like, more preferably $\alpha,\alpha'$-bis(t-butylperoxy-m-isopropyl)benzene, 1,1-bis(t-butylperoxy)-3,3,5-trimethylcyclohexane and 2,5-dimethyl-2,5-di(t-butylperoxy)hexane.

The weight ratio of the free-radical initiator to the copolymer rubber material, which depends on the type of the free-radical initiator or the kneading conditions, is usually 0.005–1.0:100, preferably 0.005–0.5: 100. When the weight ratio is less than 0.005:100, preferable bound unsaturated dicarboxylic anhydride content cannot be obtained and the effect of increasing the bound unsaturated dicarboxylic anhydride content by using the aromatic vinyl monomer, which is one of the characteristic features of the present invention, becomes reduced. On the other hand, the weight ratio is over 1.0:100, undesirable gel formation takes place.

Specific examples of the aromatic vinyl monomers used in the present invention are styrene, o-methylstyrene, p-methylstyrene, m-methylstyrene, α-methylstyrene and mixtures thereof. Among these, styrene can be preferably used.

Specific examples of the unsaturated dicarboxylic anhydrides used in the present invention are maleic anhydride, fumaric anhydride, citraconic anhydride and the like. Among these, maleic anhydride is preferably used because of high activity thereof.

The weight ratio of the vinyl aromatic monomer to the copolymer rubber material is usually 0.2–20:100, preferably 0.2–10:100. The weight ratio of the unsaturated dicarboxylic anhydride to the copolymer rubber material is usually 0.5–15:100. And the weight ratio of the vinyl aromatic monomer to the unsaturated dicarboxylic anhydride is usually 0.1–3:1, preferably 0.5–2:1.

When the weight ratio of the vinyl aromatic monomer to the unsaturated dicarboxylic anhydride is less than 0.1:1, the effect of preventing gel formation and of increasing grafted monomer amount cannot be obtained. On the other hand, when the weight ratio of the vinyl aromatic monomer to the unsaturated dicarboxylic anhydride exceeds 3:1, the improvement reaches the top.

The bound vinyl aromatic monomer content in the modified copolymer rubber of the present invention is 0.1–5% by weight and the bound unsaturated dicarboxylic anhydride content therein is 0.1–5% by weight, respectively, based on the weight of the copolymer rubber material. When the bound vinyl aromatic monomer content is less than said lower limit or the bound unsaturated dicarboxylic anhydride content is over said upper limit, the modified copolymer rubber is inferior in processability.

The Mooney viscosity $[ML_{1+4}(121°\ C.)]$ of the modified copolymer rubber of the present invention can be selected in the range of from 5 to 120, preferably 20–100. In the case where the excellent processability of the modified copolymer rubber of the present invention as a blend polymer to rubber is intended, for example, the Mooney viscosity thereof is preferably 10–75, more preferably 25–70. On the other hand, when the modified copolymer rubber of the present invention is used as an impact modifier for the general-purpose plastic or engineering plastic, the Mooney viscosity thereof can be selected in a range of from 5–120, preferably 20–100.

When the Mooney viscosity is less than 10, the rubber or resin blended with such a modified copolymer rubber becomes inferior in strength. When the Mooney viscosity is more than 120, the processability of the rubber or resin blended with such a modified copolymer rubber becomes inferior.

The modified copolymer rubber of the present invention can be obtained by kneading at 200°–280° C., preferably 230°–260° C., the above-mentioned four components. When oxygen concentration is too high at the kneading, gel formation or color development sometimes takes place, so that it is preferable to carry out the kneading under substantially oxygen-free conditions.

When the temperature is lower than 200° C., preferable bound unsaturated dicarboxylic anhydride content cannot be obtained and the effect of increasing grafted monomer amount is low. On the other hand, the temperature is over 280° C., the effect of increasing grafted monomer amount hits the ceiling and gel formation or color development sometimes takes place.

The type of a kneader for obtaining the modified copolymer rubber of the present invention is not critical; however, in general, it is preferable to use an extruder of uniaxial or biaxial screw-type suitable for uniformly kneading the four components used in the present invention, because thereby continuous production can be carried out.

The retention time in the extruder, which depends on the kneading temperature or the type of the free-radical initiator, generally about 0.2–10 minutes, preferably 0.5–5 minutes, more preferably 1–3 minutes.

The above-mentioned four components can be fed into the extruder separately; however, the uniform mixture of all or some components can be fed thereinto. For example, there can be adopted a method that the copolymer rubber material impregnated with the free-radical initiator and the vinyl aromatic monomer is fed simultaneously with the unsaturated dicarboxylic anhydride into the extruder. Or a method that the free-radical initiator and/or the unsaturated dicarboxylic anhydride are fed into the extruder at the midway thereof can be adopted. Moreover, in the process of the present invention, plastics such as polypropylene, polyethylene, Nylon, polyester, ABS, polyphenylene ether and the like or polymers such as styrene-butadiene block copolymer, styrene-isoprene block copolymer, hydrogenated products thereof and the like can be added optionally at the entrance of the extruder, whereby two or more polymers can be co-modified.

For removing the unreacted vinyl aromatic monomer and unsaturated dicarboxylic anhydride, there can be adopted a method comprising sucking the same by a vacuum pump through a vent line at the midway or around the exit of the extruder or a method comprising dissolving the kneading product in a proper solvent followed by purifying the separation.

The modified copolymer rubber of the present invention has the bound vinyl aromatic monomer and unsaturated dicarboxylic anhydride. And since the bound unsaturated dicarboxylic anhydride is hardly converted to carboxylic acid form by water in the air, the modified copolymer rubber of the present invention shows an excellent processability for a long period of time. In the process of the present invention, the effect of increasing the bound unsaturated dicarboxylic anhydride content can be improved and gel formation can be inhibited by using vinyl aromatic monomer at the grafting stage. Therefore, the unsaturated dicarboxylic anhydride used for obtaining the target bound unsaturated dicarboxylic anhydride content can be reduced, whereby it is not necessary to remove the unreacted unsaturated dicarboxylic anhydride. Thus, the process of the present invention is very economical and effective.

The modified copolymer rubber of the present invention can be used as it is as a thermoplastic elastomer. It is also usable for a blending polymer. For example, a proper amount of the modified copolymer rubber of the present invention can be blended with general-purpose plastics such as polypropylene, polyethylene, polystyrene, ABS, PVC and the like or engineering plastics such as Nylon, polyacetal, polycarbonate, (modified) polyphenylene ether, polybutylene terephthalate and the like to improve adhesiveness, impact resistance and flexibility thereof.

It also can be blended with rubbers such as EPM, EPDM, styrene-butadiene rubber, butadiene rubber and the like to improve adhesiveness, vulcanizability, processability and mechanical properties thereof.

Particularly, blending the modified copolymer rubber of the present invention with a substance having hydroxy group, amino group or epoxy group is highly effective for improving the physical properties thereof.

Also, the modified copolymer rubber of the present invention can be used for primer for coating, adhesive, adhesive tape and the like.

The present invention is explained in more detail in the following Examples, Comparative Examples and Reference Example which are by way of illustration and not by way of limitation.

The bound maleic anhydride content in modified copolymer rubber was determined as follows:

A small amount of sample extrudate was dissolved in toluene and then precipitated for purification by adding absolute acetone thereto The precipitate was again dissolved in toluene. Keeping the resulting solution warm (85° C.), it was titrated by ethanol solution of KOH using phenolphthalein as an indicator.

The bound styrene content in modified copolymer rubber was determined from the intensity of infrared absorption due to substituted benzene ring of the above-mentioned purified sample.

The formed gel content was defined as the insolubles (% by weight) in hot xylene (90° C.).

The Mooney viscosity [$ML_{1+4}(121°$ C.) was measured at 121° C. according to JIS K6300.

The roll processability of modified copolymer rubber was evaluated as follows:

Tailing of modified copolymer rubber was repeated ten times to obtain a sheet using a pair of 6-inch rolls at 50° C., the gap between these rolls being 0.2 mm. The processability and surface profile of the sheet were classified to the following five ratings.

◯: a surface-smooth sheet was obtained easily.

◯–Δ: a medium characteristics between ◯ and Δ.

Δ: only a sheet having an irregular unevenness on the surface was obtained.

Δ–X: a medium characterisics between Δ and X.

X: no sheet was obtained, and in some cases, the material became powdery.

EXAMPLE 1

100 parts by weight of Esprene® E201 (mfd. by Sumitomo Chemical Co., Ltd. for EPM, ethylene content: 47% by weight, number-average molecular weight: 55,000, $ML_{1+4}(121°$ C.)=32) as the ethylene-α-olefin copolymer rubber, 0.08 part by weight of 1,1-bis(t-butylperoxy)-3,3,5-trimethylcyclohexane and 5 parts by weight of styrene were mixed together by a mixing roll to obtain a mixture. This mixture was fed with 10 parts by weight of maleic anhydride into a biaxial screw-type extruder (cylindrical diameter: 44 mm, number of screw revolutions: 450 r.p.m.) in nitrogen atmosphere, and was extruded at a kneading temperature of about 250° C. at a kneading time of 2.5 minutes and an extrusion rate of 18 kg/hr to obtain a modified copolymer rubber.

The bound maleic anhydride content in the modified copolymer rubber obtained was 2.8% by weight and the bound styrene content was 1.3% by weight. The Mooney viscosity [$ML_{1+4}(121°$ C.)] was 50. No gel formation was observed and the roll processability was excellent.

COMPARATIVE EXAMPLE 1

The same procedure as in Example 1 was repeated except that styrene was not used. The resulting modified copolymer rubber gave a formed gel content of about 0.1% by weight, a Mooney viscosity of 45, a low bound maleic anhydride content as 0.2% by weight and a poor roll processability, so that this modified copolymer rubber did not meet the object of the present invention.

EXAMPLES 2-4 AND COMPARATIVE EXAMPLES 2 AND 3

The same procedure as in Example 1 was repeated except that the amounts of styrene, free-radical initiator and maleic anhydride used and the kneading conditions were varied as shown in Table 1, to obtain various modified copolymer rubbers. The results are shown in Table 1 together with those of Example 1 and Comparative Example 1.

TABLE 1

|  |  | Example 1 | Comparative Example 1 | Example 2 | Example 3 | Example 4 | Comparative Example 2 | Comparative Example 3 |
|---|---|---|---|---|---|---|---|---|
| Amount of Kneaded Components (parts by weight) | E201 *1 | 100 | 100 | 100 | 100 | 100 | 100 | 100 |
|  | MAH *1 | 10 | 10 | 15 | 10 | 10 | 10 | 10 |
|  | Styrene | 5 | 0 | 7.5 | 5 | 10 | 0 | 0 |
|  | Free Radical Initiator *3 | 0.08 | 0.08 | 0.08 | 0.08 | 0.08 | 3.5 | 1.0 |
| Kneading Temperature (°C.) |  | 250 | 248 | 257 | 270 | 260 | 259 | 340 |
| Analytical Data (% by weight) | Bound MAH *2 Content | 2.8 | 0.2 | 3.7 | 2.5 | 3.5 | 0.5 | 0.6 |
|  | Bound Sytrene Content | 1.3 | — | 1.8 | 1.1 | 2.2 | — | — |
|  | Formed Gel Content | 0.0 | 0.1 | 0.0 | 0.0 | 0.0 | 38 | 45 |
| Mooney Viscosity [$ML_{1+4}(121°$ C.)] |  | 50 | 45 | 55 | 49 | 55 | impossible to measure by a gel formation | impossible to measure by a gel formation |
| Roll Processability |  | ◯ | Δ | ◯ | ◯ | ◯ | X | X |

*1 Esprene ® E201 mfd. by Sumitomo Chemical Co., Ltd. for EPM
*2 Maleic Anhydride
*3 Perhexa ® 3M mfd. by Nippon Oil & Fats Co., Ltd. for 1,1-bis(t-butylperoxy)-3,3,5-trimethylcyclohexane

EXAMPLES 5-11

100 parts of pellets or grinds of various copolymer rubber materials as shown in Table 2, 0.08 part by weight of α,α'-bis(t-butylperoxy-m-isopropyl)-benzene, 2.0 parts by weight of styrene and 2.0 parts by weight of maleic anhydride were mixed together by Henschel mixer to obtain various mixtures. These mixtures were kneaded in the same manner as in Example 1 at about 250° C. using a biaxial screw-type extruder to obtain various modified copolymer rubbers.

All of them had an excellent roll processability.

On the other hand, the modified copolymer rubber of Example 6 was subjected to a compression molding at 130° C. to obtain a sheet having a thickness of 2 mm. The physical properties of this sheet were measured at a stress rate of 500 mm/min at 23° C. and the results were 19 kg/cm$^2$ in stress at 100% elongation, 76 kg/cm$^2$ in strength at break and 870% in elongation at break. They were all excellent for a thermoplastic elastomer.

COMPARATIVE EXAMPLES 4–10

The same procedure as in Examples 5–11 was repeated except that styrene was not used in the kneading stage. The results are shown in Table 2 together with those of Examples 5–11. The modified copolymer rubber of the Comparative Examples having a nearly equal or higher viscosity than those of Examples were inferior in processability though they have a low bound MAH content. It is also shown that when the content of nonconjugated diene was more than 3% by weight, the formed gel content was remarkably increased.

TABLE 2

| | | Example 5 | Comparative Example 4 | Example 6 | Comparative Example 5 | Example 7 | Comparative Example 6 |
|---|---|---|---|---|---|---|---|
| Copolymer Rubber Material | Ethylene Content (% by weight) | 47 | | 78 | | 82 | |
| | α-Olefin Species | propylene | | propylene | | 1-butene | |
| | Nonconjugated Diene Species | — | | — | | — | |
| | Nonconjugated Diene Content (% by weight) | 0 | | 0 | | 0 | |
| | Number-Average Molecular Weight | 55,000 | | 60,000 | | 50,000 | |
| | Mooney Viscosity [ML$_{1+4}$(121° C.)] | 32 | | 23 | | 21 | |
| Amount of Kneaded Components (parts by weight) | Polymer Rubber Material | 100 | 100 | 100 | 100 | 100 | 100 |
| | MAH | 2.0 | 2.0 | 2.0 | 2.0 | 2.0 | 2.0 |
| | Styrene | 2.0 | 0 | 2.0 | 0 | 2.0 | 0 |
| | Free-Radical *5 Initiator | 0.08 | 0.08 | 0.08 | 0.08 | 0.08 | 0.08 |
| Kneading Temperature (° C.) | | 250 | 250 | 250 | 250 | 250 | 250 |
| Analytical Data (% by weight) | Bound MAH Content | 1.2 | 0.5 | 1.5 | 0.7 | 1.0 | 0.6 |
| | Bound Styrene Content | 0.7 | 0 | 0.8 | 0 | 0.6 | 0 |
| | Formed Gel Content | 0.1 | 0.1 | 0 | 0 | 0.1 | 0.1 |
| Mooney Viscosity [ML$_{1+4}$(121°C.)] | | 40 | 65 | 70 | 72 | 70 | 91 |
| Roll Processabiltiy | | ○ | Δ | ○ | Δ-X | ○ | Δ-X |

| | | Example 8 | Comparative Example 7 | Example 9 | Comparative Example 8 | Comparative Example 9 | Comparative Example 10 |
|---|---|---|---|---|---|---|---|
| Copolymer Rubber Material | Ethylene Content (% by weight) | 65 | | 53 | | 50 | |
| | α-Olefin Species | 1-butene | | propylene | | propylene | |
| | Nonconjugated Diene Species | — | | ENB *4 | | ENB *4 | |
| | Nonconjugated Diene Content (% by weight) | 0 | | 2.5 | | 5.2 | |
| | Number-Average Molecular Weight | 45,000 | | 60,000 | | 55,000 | |
| | Mooney Viscosity [ML$_{1+4}$(121° C.)] | 9 | | 38 | | 32 | |
| Amount of Kneaded Components (parts by weight) | Polymer Rubber Material | 100 | 100 | 100 | 100 | 100 | 100 |
| | MAH | 2.0 | 2.0 | 2.0 | 2.0 | 4.0 | 2.0 |
| | Styrene | 2.0 | 0 | 2.0 | 0 | 0 | 0 |
| | Free-Radical *5 Initiator | 0.08 | 0.08 | 0.08 | 0.08 | 0.08 | 0.08 |
| Kneading Temperature (° C.) | | 250 | 250 | 250 | 250 | 250 | 250 |
| Analytical Data (% by weight) | Bound MAH Content | 1.2 | 0.6 | 1.4 | 0.6 | 0.7 | 0.1 |
| | Bound Styrene Content | 0.7 | 0 | 0.8 | 0 | 0.4 | 0 |
| | Formed Gel Content | 0.1 | 0.1 | 0.1 | 1.1 | 0.4 | 0 |
| Mooney Viscosity [ML$_{1+4}$(121°C.)] | | 50 | 60 | 60 | 60 | impossible to measure by a gel formation | impossible to measure by a gel formation |
| Roll Processability | | ○ | Δ | ○ | Δ-X | Δ | X |

TABLE 2-continued

|  |  |  | Example 10 | Example 11 |
|---|---|---|---|---|
|  | Copolymer Rubber Material | Ethylene Content (% by weight) |  | 78 |
|  |  | α-Olefin Species | propylene |  |
|  |  | Nonconjugated Diene Species | — |  |
|  |  | Nonconjugated Diene Content (% by weight) |  | 0 |
|  |  | Number-Average Molecular Weight |  | 35,000 |
|  |  | Mooney Viscosity [$ML_{1+4}(121°\,C.)$] |  | 10 |
|  | Amount of Kneaded Components (parts by weight) | Polymer Rubber Material | 100 | 100 |
|  |  | MAH | 1.6 | 1.4 |
|  |  | Styrene | 1.6 | 0.7 |
|  |  | Free-Radical *5 Initiator | 0.08 | 0.08 |
|  | Kneading Temperature (° C.) |  | 250 | 250 |
|  | Analytical Data (% by weight) | Bound MAH Content | 1.3 | 1.1 |
|  |  | Bound Styrene Content | 0.8 | 0.3 |
|  |  | Formed Gel Content | 0.8 | 0.3 |
|  | Mooney Viscosity [$ML_{1+4}(121°C.)$] |  | 30 | 40 |
|  | Roll Processability |  | ○ | ○ |

*4 Ethylidene norbornene
*5 α,α'-bis(t-butylperoxy-m-isopropyl) benzene

EXAMPLES 12-15

The same procedure as in Example 6 was repeated except that the kneading temperature is changed to obtain various modified copolymer rubbers.

COMPARATIVE EXAMPLES 11-14

The same procedure as in Examples 12-15 was repeated except that styrene was not used at the kneading stage.

The results are shown in Table 3 together with Examples 6, 12-15 and Comparative Example 5. The modified copolymer rubbers of Comparative Examples 11-14 had lower bound maleic anhydride contents and roll processabilities than those of Examples 12-15 in which styrene was used, though no gel formation was observed.

TABLE 3

|  | Kneading Conditions |  | Analytical Data (% by weight) |  |  |  |
|---|---|---|---|---|---|---|
|  | Amount of Kneaded Styrene (parts by weight) | Kneading Temperature (°C.) | Bound MAH Content | Bound Styrene Content | Mooney Viscosity [$ML_{1+4}(121°\,C.)$] | Roll Processability |
| Example 12 | 2.0 | 200 | 0.7 | 0.4 | 53 | ○ |
| Example 13 | 2.0 | 215 | 1.1 | 0.5 | 60 | ○ |
| Example 14 | 2.0 | 230 | 1.4 | 0.7 | 69 | ○ |
| Example 6 | 2.0 | 250 | 1.5 | 0.8 | 70 | ○ |
| Example 15 | 2.0 | 275 | 1.2 | 0.7 | 66 | ○ |
| Comparative Example 11 | 0 | 200 | 0.4 | — | 50 | Δ-X |
| Comparative Example 12 | 0 | 215 | 0.5 | — | 57 | Δ-X |
| Comparative Example 13 | 0 | 230 | 0.5 | — | 59 | Δ-X |
| Comparative Example 5 | 0 | 250 | 0.7 | — | 70 | X |
| Comparative Example 14 | 0 | 275 | 0.9 | — | 83 | X |

EXAMPLES 16-18

The same procedure as in Example 6 was repeated except that the amount of styrene used was changed to obtain various modified copolymer rubbers.

They showed excellent roll processabilities and no gel formation was observed. The results are shown in Table 4.

TABLE 4

|  |  | Analytical Data (% by weight) |  |  |  |
|---|---|---|---|---|---|
|  | Amount of Kneaded Styrene (parts by weight) | Bound MAH Content | Bound Styrene Content | Mooney Viscosity [$ML_{1+4}(121°\,C.)$] | Roll Processability |
| Example 16 | 1.0 | 1.0 | 0.4 | 60 | ○ |
| Example 6 | 2.0 | 1.5 | 0.8 | 70 | ○ |
| Example 17 | 4.0 | 1.8 | 1.4 | 77 | ○ |
| Example 18 | 6.0 | 1.8 | 2.0 | 78 | ○ |
| Comparative | 0 | 0.7 | — | 70 | X |

TABLE 4-continued

| | Amount of Kneaded Styrene (parts by weight) | Analytical Data (% by weight) | | Mooney Viscosity [ML$_{1+4}$(121° C.)] | Roll Processability |
|---|---|---|---|---|---|
| | | Bound MAH Content | Bound Styrene Content | | |
| Example 5 | | | | | |

EXAMPLES 19-21 AND COMPARATIVE EXAMPLES 15-17

Example 6 or Comparative Example 5 was repeated except that the amount of the free-radical initiator was changed to obtain various modified copolymer rubbers.

The modified copolymer rubbers of Comparative Examples 15-17 were inferior in bound maleic anhydride content and roll processability compared with those of Examples 19-21. The results are shown in Table 5.

TABLE 5

| | Kneading Conditions | | Analytical Data (% by weight) | | Mooney Viscosity [ML$_{1+4}$(121° C.)] | Roll Process-ability |
|---|---|---|---|---|---|---|
| | Amount of Kneaded Styrene (parts by weight) | Amount of Free-Radical Initiator (parts by weight) | Bound MAH Content | Bound Styrene Content | | |
| Example 19 | 2.0 | 0.008 | 0.9 | 0.6 | 59 | ○ |
| Example 20 | 2.0 | 0.02 | 1.2 | 0.7 | 66 | ○ |
| Example 6 | 2.0 | 0.08 | 1.5 | 0.8 | 70 | ○ |
| Example 21 | 2.0 | 0.4 | 1.2 | 0.7 | 67 | ○ |
| Comparative Example 15 | 0 | 0.008 | 0.3 | — | 45 | Δ |
| Comparative Example 16 | 0 | 0.02 | 0.5 | — | 57 | Δ-X |
| Comparative Example 5 | 0 | 0.08 | 0.7 | — | 70 | X |
| Comparative Example 17 | 0 | 0.4 | 0.8 | — | 76 | X |

COMPARATIVE EXAMPLE 18

The same procedure as in Comparative Example 5 was repeated except that the amount of maleic anhydride used was changed to 4.0 parts by weight in order to obtain the same bound maleic anhydride content in Example 6 to obtain a modified copolymer rubber having a bound maleic anhydride content of 1.5% by weight.

Although gel formation was not observed, the Mooney viscosity of this rubber was 125 (higher than 70, that of Example 6) and this film was greatly inferior in roll processability since styrene was not used.

On the other hand, using the rubbers of Example 6 and Comparative Example 18, conversions of bound maleic anhydride to bound maleic acid were determined. The method for examination was as follows:

The copolymer rubbers of Example 6 and Comparative Example 18 were stored in a chamber of which the temperature and humidity were controlled at 60° C. and 80%, respectively. At prescribed intervals as shown in Table 6, small amounts of the copolymer rubbers were sampled and analized by means of infrared spectroscopy, whereby conversions of the bound maleic anhydride to bound maleic acid, that is ring-opening percentage by water, was calculated.

The ring-opening percentage by water was defined as $[\epsilon_2/(\epsilon_1+\epsilon k_2)] \times 100$ (%), wherein $\epsilon_1$ was the absorbance of maleic anhydride at 1785 cm$^{-1}$ and $\epsilon_2$ was the absorbance of maleic acid at 1705 cm$^{-1}$.

The results are shown in Table 6.

It is evident from Table 6 that the modified copolymer rubber of the present invention has an excellent resistance to ring-opening by water and storage stability.

Moreover, it was found that the modified copolymer rubber of the present invention had an excellent surface profile even when it was extruded in a high shear rate from the results of the extrusion processability test on the above-mentioned copolymer rubbers by means of a capilary rheometer.

The results are also shown in Table 6.

TABLE 6

| | | Example 6 | Comparative Example 18 |
|---|---|---|---|
| Modified Copolymer Rubber | Bound MAH Content (% by weight) | 1.5 | 1.5 |
| | Bound Styrene Content (% by weight) | 0.8 | — |
| | Mooney Viscosity [ML$_{1+4}$(121° C.)] | 70 | 125 |
| | Roll Processability | ○ | X |
| Ring-Opening Percentage by Water with the Lapse of Time (%) | 0 hr | 0 | 10 |
| | 2 hrs | 8 | 77 |
| | 4 hrs | 10 | 82 |
| | 8 hrs | 12 | 91 |
| | 12 hrs | 15 | 94 |
| Surface Profile * of Extruded | 6 sec$^{-1}$ | excellent | excellent |
| | 12 sec$^{-1}$ | excellent | melt fractured |

TABLE 6-continued

|  | | Example 6 | Comparative Example 18 |
|---|---|---|---|
| Product at Various Shear Rate | 24 sec$^{-1}$ | excellent | melt fractured |
| | 36 sec$^{-1}$ | melt fractured | melt fractured |

* A capilary rheometer mfd. by Toyo Seiki Co., Ltd. was used. The examination was carried out at 150° C. using a dice having a L/D value of 10.

EXAMPLES 22 AND 23 AND COMPARATIVE EXAMPLES 19-17

PREPARATION OF MIXTURES OF A TO D

100 Parts by weight of an ethylene-propylene copolymer (EPM), a prescribed parts by weight of a free-radical initiator (See Table 7), 2.0 parts by weight of styrene and 2.0 parts by weight of maleic anhydride were mixed with a Henschel mixer to obtain each of the mixtures A to D.

The EPM used had a bound ethylene content of 78% by weight and a Mooney viscosity (ML$_{1+4}$ 121° C.) of 23. And it had been formed into the same form of pellet as Example 6 having a diameter of about 3 mm. The free-radical initiator used was α,α'-bis(tbutylperoxy-m-isopropyl)benzene.

TABLE 7

| Mixture No. | Proportion (part by weight) | | | |
|---|---|---|---|---|
| | EPM | Initiator | Styrene | Maleic anhydride |
| A | 100 | 0 | 2.0 | 2.0 |
| B | 100 | 0.008 | 2.0 | 2.0 |
| C | 100 | 0.08 | 2.0 | 2.0 |
| D | 100 | 1.2 | 2.0 | 2.0 |

Graft-modification

A laboratory plastomill having an inner volume of about 100 ml was heated at a prescribed temperature (see Table 8). The kneading was carried out in a nitrogen atmosphere (N$_2$ flow rate: 4 liters per minute) for a prescribed period in the following manner: the mill was driven at 10 r.p.m. and 60 g of each of the above mixture was introduced therein. After the introduction of the mixture had been completed, the mill was accelerated to 60 r.p.m.

The bound maleic anhydride content, the formed gel content and the strength at break were determined with the same method as shown above.

Table 8 shows the results.

In Comparative Examples 19-21 was not used a free-radical initiator which is essential for the present invention. Comparative Example 20 clearly shows that maleic anhydride was not substantially grafted even after the kneading had been continued for 10 minutes without an initiator. Comparative Example 21 demonstrates that maleic anhydride was not substantially grafted after the kneading had been carried out at 240° C. Thus, both Comparative Examples show that the use of a free-radical initiator is essential for the present invention.

As shown in Table 8, the modified copolymer rubbers of Comparative Examples exhibit a far lower strength at break due to the low graft of maleic anhydride than the rubbers of Examples.

In Comparative Examples 22-25, the kneading was carried out at a temperature lower than the lower limit of temperature of the present invention. These Comparative Examples gave a copolymer rubber containing substantially no maleic anhydride grafted and, accordingly, having a low strength at break. Particularly, in Comparative Examples 24 and 25, the produced copolymer rubbers contained substantially no maleic anhydride grafted although the kneading had been continued for 5 and 10 minutes, respectively. These data demonstrate the criticality of the kneading temperature limitation of the present invention.

In Comparative Example 26, the free-radical initiator was employed in an amount above the upper limit of the present invention. As a result, gel was formed in the mixture during the kneading so strikingly that a sample sheet for strength at break could not be prepared.

Comparing Comparative Example 21 with Comparative Example 27 shows that lengthening the kneading time without adding a free-radical initiator does not give sufficient bound maleic anhydride amount even at an elevated temperature (240° C.).

On the contrary, the kneading with employing a large amount of free-radical initiator at a low temperature has a number of demerits, some of which are as follows.

First, even though the temperature in extruder is severely controlled, employing a large amount of free-radical initiator is dangerous when the temperature is out of control.

TABLE 8

| | Mixture used | Amount of initiator* in mixture | Polymer temperature at kneading (°C.) | Kneading time (min) | Formed gel content (wt. %) | Bound maleic anhydride (wt. %) | Strength at break (kg/cm$^2$) |
|---|---|---|---|---|---|---|---|
| Comparative Example 19 | A | 0 | 167 | 1.5 | 0 | 0.01 | 28 |
| Comparative Example 20 | A | 0 | 170 | 10.0 | 0 | 0.01 | 27 |
| Comparative Example 21 | A | 0 | 240 | 1.5 | 0 | 0.04 | 28 |
| Comparative Example 22 | B | 0.008 | 135 | 1.5 | 0 | 0.01 | 28 |
| Comparative Example 23 | B | 0.008 | 165 | 1.5 | 0 | 0.22 | 34 |
| Example 22 | B | 0.008 | 230 | 1.5 | 0 | 0.85 | 60 |
| Comparative Example 24 | B | 0.008 | 137 | 5.0 | 0 | 0.04 | 28 |
| Comparative Example 25 | B | 0.008 | 146 | 10.0 | 0 | 0.02 | 27 |
| Example 23 | C | 0.08 | 240 | 1.5 | 0 | 1.35 | 78 |
| Comparative Example 26 | D | 1.2 | 256 | 1.5 | 56.5 | 0.30 | ** |
| Comparative Example 27 | A | 0 | 240 | 10.0 | 0 | 0.04 | 28 |

*The amount of initiator is parts by weight per part by weight of the raw material rubber.
**Sample sheet for measurement could not be prepared.

Second, the unreacted free-radical initiator remains in the product and gradually damages the quality of the product such as unexpected curing of the rubber.

Third, at a low temperature, the copolymer to be extruded is so viscous that the long-term stable extrusion cannot be carried out.

Accordingly, there is a certain upper limit of the amount employed of free-radical initiator.

By contrast, Examples 22 and 23 satisfying the requirements of the present invention gave a modified copolymer rubber sufficiently grafted with maleic anhydride. The data shows that thus obtained rubbers have a high strength at break. As demonstrated in these Examples, according to the present invention, it is possible to graft a sufficiently large amount of maleic anhydride onto the copolymer rubber within a short period of time without being obstructed by gel formation.

In general, kneading can be carried out by either batch-wise or continuous process. The continuous process is preferred since it is highly productive and gives a product of uniform quality. However, it is necessary to shorten the kneading time for carrying out the continuous process. According to the present invention, the kneading time can be shortened without any demerits, whereby the continuous process can be advantageously carried out. It is no exaggeration to say that the process of the present invention is of high industrial value.

REFERENCIAL EXAMPLE

The following is an example of an adhesive comprising the modified copolymer rubber of the present invention (Example 6) for a vulcanized EPDM.

An adhesive was prepared by dissolving in toluene the modified copolymer rubber of Example 6 in a concentration of 10% by weight. In the case where hexamethylenediamine carbamate was added thereto as a crosslinking agent, amount used thereof was 1 phr.

Adherends were prepared according to the following recipes and each of them were referred to as Compounds A and B. Numbers in the recipe were parts by weight.

|  | Compound A | Compound B |
|---|---|---|
| Esprene ® 512F *1 | 100 | 100 |
| Seast ® SO *2 | 150 | 120 |
| Nipsil ® VN3 *3 | — | 30 |
| Diana ® PW-90 *4 | 100 | 100 |
| ZnO | 5 | 5 |
| Stearic acid | 1 | 1 |
| PEG-4000 | — | 2 |
| Soxinol ® BZ *5 | 2 | 2 |
| Soxinol ® TT *6 | 0.5 | 0.5 |
| Soxinol ® TRA *7 | 0.5 | 0.5 |
| Soxinol ® M *8 | 1 | 1 |
| Sulfur | 1.5 | 1.5 |
| Vulcanization conditions | 170° C., 10 min. | 170° C., 10 min. |

*1 mfd. by Sumitomo Chemical Co., Ltd. for EPDM
*2 mfd. by Tokai Carbon Co., Ltd. for carbon black
*3 mfd. by Nippon Silica Kogyo Co., Ltd. for silica
*4 mfd. by Idemitsu Kosan for process oil
*5 vulcanization accelerator mfd. by Sumitomo Chemical Co., Ltd. for zinc di-n-butyl dithiocarbamate
*6 vulcanization accelerator mfd. by Sumitomo Chemical Co., Ltd. for tetramethylthiuram disulfide
*7 vulcanization accelerator mfd. by Sumitomo Chemical Co., Ltd. for dipentamethylenethiuram tetrasulfide
*8 vulcanization accelerator mfd. by Sumitomo Chemical Co., Ltd. for 2-mercaptobenzothiazole The adhesive was coated on the surfaces of two sheets of degreased adherend, and after 30 minutes of open time, they were laminated and contact bonded by means of 2 kg-hand roller. Thereafter, they were heated at 80° C. for 40 minutes and then cured at a room temperature for 6 days.

The adherend sheets having a width of 20 mm was subjected to a peeling test at a peeling rate of 50 mm/min at 180° C. in order to measure an adhesive strength (kgf/20 min).

As shown in Table 7, the modified copolymer rubber of the present invention was suitably used for the adhesive having an excellent adhesiveness for vulcanized EPDM.

TABLE 9

| Adherend | Adhesive | Adhesive Strength (kgf/20 mm) |
|---|---|---|
| Compound A | Example 6 | 5.4 |
|  | Example 6 plus a crosslinking agent | 6.6 |
| Compound B | Example 6 | 6.3 |
|  | Example 6 plus a crosslinking agent | 7.6 |

What is claimed is:

1. A process for producing a modified copolymer rubber comprising kneading at 200°–280° C.,
   (A) at least one copolymer rubber material selected from the group consisting of an ethylene-α-olefin copolymer rubber having a number-average molecular weight of 10,000–100,000 and an ethylene content of 15–85% by weight and an ethylene-α-olefin-nonconjugated diene copolymer rubber having a number-average molecular weight of 10,000–100,000, an ethylene content of 15–85% by weight and a nonconjugated diene content of 3.0% by weight or less,
   (B) a free-radical initiator,
   (C) at least one vinyl aromatic monomer and
   (D) an unsaturated dicarboxylic anhydride, wherein the weight ratios of (B):(A), (C):(A), (D):(A) and (C):(D) are 0.005–1.0:100, 0.2–20:100, 0.5–15:100 and 0.1–3:1, respectively.

2. A process for producing a modified copolymer rubber according to claim 1, wherein the copolymer rubber material is ethylene-propylene copolymer rubber or ethylene-1-butene copolymer rubber.

3. A process for producing a modified copolymer rubber according to claim 1, wherein the free-radical initiator is an organic peroxide.

4. A process for producing a modified copolymer rubber according to claim 1, wherein the vinyl aromatic monomer is styrene.

5. A process for producing a modified copolymer rubber according to claim 1 or 4, wherein the unsaturated dicarboxylic anhydride is maleic anhydride.

6. A process for producing a modified copolymer rubber according to claim 1, wherein the Mooney viscosity [$ML_{1+4}$ (121° C.)] of said modified copolymer rubber is 5–120.

7. A process for producing a modified copolymer rubber according to claim 1, wherein the Mooney viscosity [$ML_{1+4}$ (121° C.)] of said modified copolymer rubber is 20–100.

8. A process for producing a modified copolymer rubber according to claim 1, wherein the kneading is carried out for 0.2–10 minutes.

9. A process for producing a modified copolymer rubber according to claim 1, wherein the weight ratio of (B):(A) is 0.005–0.5:100.

10. A process for producing a modified copolymer rubber according to claim 1, wherein the kneading temperature is 230°-260° C.

11. A process for producing a modified copolymer rubber according to claim 1, wherein the nonconjugated diene is ethylidene norbornene.

12. A process for producing a modified copolymer rubber according to claim 1, wherein the vinyl aromatic monomer is at least one member selected form the group consisting of styrene, o-methylstyrene, p-methylstyrene, m-methylstyrene and α-methylstyrene.

13. A process for producing a modified copolymer rubber according to claim 1, wherein the unsaturated dicarboxylic anhydride is one member selected from the group consisting of maleic anhydride, fumaric anhydride and citraconic anhydride.

14. A process for producing a modified copolymer rubber according to claims 12 or 13, wherein the unsaturated dicarboxylic anhydride is maleic anhydride.

15. A process for producing a modified copolymer rubber according to claim 1, wherein the weight ratio of (C):(A) is 0.2-10:100.

16. A process for producing a modified copolymer rubber according to claim 1, wherein the kneading time is 1-3 minutes.

* * * * *